United States Patent [19]

Schwarcz

[11] 3,851,761
[45] Dec. 3, 1974

[54] PRESSURE-SENSITIVE ADHESIVE TAPES INCLUDING A POLYCARBAMATE RELEASE COATING

[75] Inventor: Andor Schwarcz, Niskayuna, N.Y.

[73] Assignee: Nashua Corporation, Nashua, N.H.

[22] Filed: Sept. 28, 1972

[21] Appl. No.: 292,905

[52] U.S. Cl............ 206/411, 117/68.5, 117/76 A, 117/122 P, 117/122 PF, 260/77.5 CH, 260/77.5 AQ, 260/77.5 SP, 260/77.5 AM, 260/75 NH
[51] Int. Cl. ............................................. C09j 7/02
[58] Field of Search ............ 117/68.5, 76 A, 122 P, 117/122 PF; 260/77.5 CH, 77.5 AQ, 77.5 SP, 77.5 AM, 77.5 NH; 206/411

[56] References Cited
UNITED STATES PATENTS

| | | | |
|---|---|---|---|
| 3,282,727 | 11/1966 | Crone et al. | 117/68.5 |
| 3,394,799 | 7/1968 | Ritson et al. | 117/134 X |
| 3,475,196 | 10/1969 | Bartell et al. | 117/144 X |
| 3,499,858 | 3/1970 | Strassel | 260/77.5 X |
| 3,510,342 | 5/1970 | Demmig et al. | 117/155 X |
| 3,590,017 | 6/1971 | Bartell et al. | 117/68.5 X |
| 3,607,837 | 9/1971 | Reegen | 260/77.5 |
| 3,637,573 | 1/1972 | Mise et al. | 260/77.5 X |
| 3,658,574 | 4/1972 | Izzi et al. | 117/68.5 X |

Primary Examiner—William D. Martin
Assistant Examiner—Bernard D. Pianalto
Attorney, Agent, or Firm—Kenway & Jenney

[57] ABSTRACT

Release agents are provided which comprise the polymeric reaction product of a fatty diamine with a diisocyanate and, optionally, a diol. These polyurea and polycarbamate products have the following recurring formula:

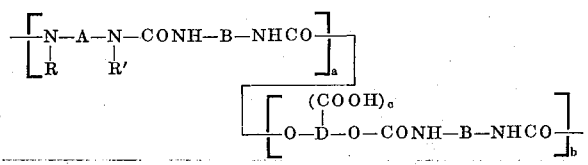

wherein A is an alkylene radical containing about two to six carbon atoms, B is an arylene radical containing about 6 to 16 carbon atoms, D is an aliphatic organic radical containing about two to six carbon atoms, R is an alkyl radical containing about 12 to 25 carbon atoms, R' is hydrogen or an alkyl radical containing about one to 25 carbon atoms, $a$ and $b$ represent the number of recurring units and the ratio of $b/a$ varies from 0 to 2, and $c$ is 0, 1 or 2. Also provided are pressure sensitive adhesive tapes and release liners utilizing these novel release agents.

10 Claims, No Drawings

PRESSURE-SENSITIVE ADHESIVE TAPES INCLUDING A POLYCARBAMATE RELEASE COATING

BACKGROUND OF THE INVENTION a. Field of the Invention

This invention relates in general to novel polyurea and polycarbamate compositions and mixtures thereof useful as release agents for the manufacture of release liners and pressure-sensitive adhesive tapes. More particularly, it relates to pressure-sensitive adhesive tapes incorporating these release agents as a coating on their backing member.

b. Description of the Prior Art

Release agents for pressure-sensitive adhesive tapes, are, in general, used to prevent, or at least reduce, the transfer of the adhesive mass during unwind from a roll thereof, to the backing member, and to control the unwind tension. A release coat provides suitable release properties only if it is less adherent to the adhesive mass than is the backing member itself. However, the release coat must have sufficient adhesion to the backing member to prevent "pick-off" thereof by the adhesive mass. And, it must have a suitable amount of adhesion to the adhesive mass otherwise it will unwind too readily when in roll form. Thus, it is seen that a release coating to be suitable must involve a balancing of various desired characteristics. It has been found, however, that with some release agents, although initially good release characteristics are provided; after extended contact with an adhesive mass, particularly at elevated temperatures, undesirable side effects are noted. Thus, the adhesion between the release coat and adhesive mass may be so great as to make unwinding very difficult, if not impossible. Various other disadvantages associated with the use of release agents now known to the prior art are also known.

It is known in the art to use certain poly N-acyl-imines as release agents for adhesive tapes. For example, U.S. Pat. Nos. 3,475,196 and 3,590,017 describe release agents comprising poly N-acyl-imines prepared by the reaction of a polyalkylene imine such as polyethylene imine with a straight chain isocyanate such as stearyl isocyanate. U.S. Pat. Nos. 3,394,799; 3,510,342; and 3,282,727 describe similar products useful as release agents. However, release agents of this type do not provide the advantageous properties associated with the release agents of this invention. Thus, the novel class of release agents, as disclosed hereinafter, provides a pressure-sensitive adhesive tape which unwinds satisfactorily after storage even in a warm environment, and the adhesive exhibits substantially unimpaired tack and adhesion.

SUMMARY OF THE INVENTION

It is accordingly one object of this invention to provide a novel class of polyurea and polycarbamate compositions formed by the reaction of a diisocyanate, an N-fatty diamine and optionally, a diol.

A further object of the invention is to provide a novel class of release agents which may be used wherever release properties are desired between two contacting surfaces.

A still further object of the invention is to provide a pressure-sensitive adhesive tape product comprising a backing member, a pressure-sensitive adhesive, and as release agents therefor, a new class of polyurea and polycarbamate compositions.

An additional object is to provide release liners or carriers comprising a backing member and on at least one of its surfaces a coating of the novel release agents herein disclosed.

Other objects and advantages of the present invention will become apparent as the description thereof proceeds.

In satisfaction of the foregoing objects and advantages there is provided a novel class of polyurea and polycarbamate release agents for use in, among other things, the manufacture of pressure-sensitive adhesive tapes, the recurring units of which can be described by the following general formula.

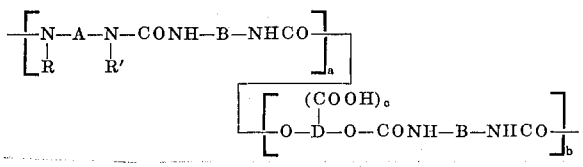

wherein A is an alkylene radical containing about two to six carbon atoms, B is an arylene radical containing about six to sixteen carbon atoms, D is an organic radical (e.g. alkylene) containing about two to six carbon atoms, R is an alkyl radical containing about 12 to 25 carbon atoms, R' is hydrogen or an alkyl radical containing about one to 25 carbon atoms, $a$ and $b$ represent the number of recurring units and the ratio of $b/a$ a varies from 0 to 2, and $c$ is 0, 1 or 2. These compounds are prepared, in general, by the polycondensation reaction of a diisocyanate and N-fatty diamine and optionally, a diol.

DETAILED DESCRIPTION OF THE PREFERRED EMBODIMENTS

As pointed out above, this invention is concerned with a novel class of polyurea and polycarbamate compositions which have been found useful as release agents for pressure-sensitive adhesive tapes. These polymeric materials are best defined by the following formula which sets forth the recurring units of the polymer:

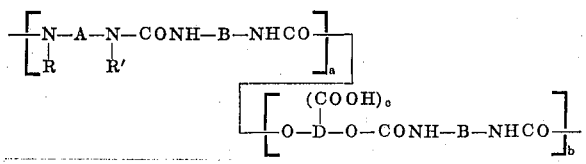

wherein A, B, D, R, R', $a$, $b$ and $c$ are as defined above.

In this formula it is preferred that A is alkylene such as ethylene, propylene, butylene, isobutylene, pentylene, and hexylene and B is an arylene radical such as phenylene, tolylene, naphthylene, biphenylene or alkyl substituted derivatives thereof wherein the alkyl groups have one to five carbon atoms. Also D is more specifically a two to six carbon aliphatic organic radical including alkylene, carboxyalkylene, and dicarboxyalkylene. R and R' are as described above and are considered to be inclusive of all alkyl groups falling within the carbon atom limitations set forth. Highly preferred R and R' groups include palmityl, stearyl, behenyl, etc.

These novel polymeric products are prepared by the reaction of a diisocyanate and N-fatty diamine and optionally, a diol, in a mole ratio approximately as follows:

2(diisocyanate) + a(diamine) + b(hydroxyl carboxylic acid)

wherein the sum of a and b is about 2 and the ratio of b/a can vary from 0 to 2. These values and ratios are incorporated into the formula set forth above.

The diisocyanate reactant employed in the process of the present invention is very well known and includes diisocyanates of the following general formula:

$$O = C = N - B - N = C = O$$

wherein B is as defined above. Particularly preferred diisocyanates include 2,4-tolylene diisocyanate, bitolylene diisocyanate, 3,3'-dimethoxy-4,4' diphenylene diisocyanate, and 2,6-tolylene diisocyanate. Of these diisocyanates, 2,4 tolylene diisocyanate is an especially preferred reactant as the release properties of agents prepared from this compound are especially good.

In the practice of this invention these diisocyanates are reacted with a class of long chain alkyl substituted diamines of the following general formula:

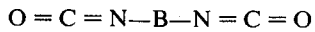

wherein A, R, and R' are as defined above. It is especially preferred that the following diamines be employed in the invention:

N-behenyl-1,3-propylene diamine
N-stearyl-1,3-propylene diamine
N-stearyl-1,2-ethylene diamine
N-stearyl-1,2-ethylene diamine
N-stearyl-N-'-methyl-1,2-ethylene diamine
N-stearyl-1,3-hexylene diamine In an optional embodiment of the invention, there may also be included in the reaction a diol preferably a carboxy-diol. Those diols which may be employed are of the general formula:

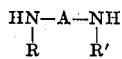

where D is an aliphatic organic radical and c is an integer 0, 1, or 2. The organic radical can be di, tri, or tetravalent depending on the value of the integer c. Highly preferred compounds of this type include tartaric acid, bis-2-(hydroxyethyl) propionic acid and bis-2-(hydroxymethyl) propionic acid. Other diols which may also be used in the practice of the invention include ethylene glycol, tetramethylene glycol, and diethylene glycol.

The release agents of the present invention are obtained by reaction of the above-identified reactants preferably in the presence of an inert organic solvent and at a temperature ranging from about room temperature up to about 180°C. The reaction of the diisocyanate with the diamine is generally instantaneous while with the diol it is not. The reaction may be conveniently carried out by dissolving the fatty diamine in an inert organic solvent, reacting it with the diisocyanate at room temperature and then further reacting with the diol at 25° to 100°C. In order to prevent the reaction mixture from gelling, any excess isocyanate should be removed or reacted with additional amines such as by capping with an aliphatic amine, e.g., dibutyl amine. The excess isocyanate can also be removed by balancing the stochiometry of the reactants. The polymeric product may then be retrieved by solvent evaporation or by pouring into an excess of a nonsolvent such as alcohol, filtering, and drying. In general those polymeric materials having an intrinsic viscosity of at least 0.05 will be found most satisfactory in release properties.

Inert organic solvents which may be used in the process include the aromatic hydrocarbon solvents such as toluene, the isomeric xylenes and benzene, ketones such as methyl ethyl ketone, N,N-dimethylformamide, N,N-dimethylacetamide, dimethylsulfoxide, and the like. Combinations or mixtures of solvents may also be used.

As pointed out above, the polymeric compositions of this invention will be found to be extremely useful wherever release properties are desired and especially as release coatings on pressure-sensitive adhesive tapes. Thus, a further aspect of the invention comprises a pressure-sensitive adhesive material which includes a pressure-sensitive adhesive on one side of a backing member and the novel release agents hereinbefore described coated on the other side. There may optionally be included a primer coating on the front side or surface of the backing material in order to improve its surface bonding characteristics to the pressure-sensitive adhesive mass which is applied thereon. Also, a base coat may be included, if desired, on the other surface of the backing member in order to improve the bonding characteristics of that surface to the release coating composition applied thereon. The invention is also inclusive of rolls of pressure-sensitive adhesive tape of suitable width and length converted from the adhesive material.

The pressure-sensitive adhesive may comprise any elastomeric material such as natural or synthetic rubber, examples of which include polyisobutylene, polybutadiene, polychlorisoprene, polyisoprene and ethylene-propylene polymers, polyvinyl $C_1$-$C_4$ ethers, copolymers of butadiene and acrylonitrile, butadiene and styrene, polyacrylates, and other synthetic and natural rubbers or elastomers. The elastomers described may be used separately or in combination. The adhesive composition may also include resinous components known as tackifying agents. These tackifying agents are usually added in order to provide adherence to surfaces to which the tape is applied without application of appreciable pressure. Examples of tackifying agents include polyterpene resins, hydrocarbon resins, polymerized or disproportionated rosin esters, wood rosin, oil soluble phenolic resins, and the like.

Other components which may be included in the pressure-sensitive adhesive composition include fillers, examples of which are clays, diatomaceous earth, silica, talc, zinc oxide, calcium carbonate, etc.; antioxidants, as for example, polyhydric phenols and their alkyl derivatives, diaryl amines, metal chelating agents, etc.; and plasticizers such as mineral oil, lanolin, liquid polybutenes or polyacrylates.

As before-mentioned, primers which improve the bonding characteristics of certain backing material surfaces, for better adhesion of the pressure-sensitive adhesive thereto, may also be used. These include natural and synthetic elastomers which can be applied in solution or in latex form. The optional base coat for the other surface of the backing member includes both thermoplastic and thermosetting coating resins such as alkyds, vinyls, acrylics, etc.

The pressure-sensitive adhesive is preferably applied to the backing member, which may or may not have a primer coating thereon, in the form of a solvent solution of emulsion. However, it may also be applied as a hot-melt adhesive. The solvent may be any solvent for the particular pressure-sensitive adhesive, including aromatics such as benzene, toluene, and xylene, aliphatics such as low boiling naphthas, hexane, pentane and the like, ketones such as methyl ethyl ketone and methyl isobutyl ketone, and chlorinated hydrocarbons such as chlorobenzene, trichloroethylene, ethylene dichloride, and carbon tetrachloride. Alcohols and water or other polar solvents may be used when applicable as a solvent or emulsifying medium for the adhesive.

The pressure-sensitive adhesive is generally prepared by dissolving the elastomeric material in a solvent, or dispersing it in an emulsifying solution. To the adhesive mixture may be added the various additives, as for example, the tackifying agent, plasticizer, antioxidant and filler. The components are blended in the solvent or emulsified until smooth. Heat may be required to achieve a uniform solution or dispersion.

The adhesive composition is applied to the backing material (which may first have been coated with a primer coating), by any convenient method, e.g., calendering, extrusion, kiss roll coating, etc. The solvent or emulsifying liquid, where the composition contains these, is removed from the adhesive composition by evaporation, e.g., by heating. The adhesive material is then generally wound on itself for storage and slit into rolls of suitable width and length.

The weight of pressure-sensitive adhesive composition (on a dry basis) is preferred to be in the range of between about 0.5–4.0 ounces per square yard of backing member, but may be outside this range if required for specific purposes. The thickness of the backing member is usually greater than about 0.5 mils.

Application of the polyurea and/or polycarbamate release agents of this invention to the surface of the backing member may be by dissolving the polymeric material in a solvent or dispersing it in a carrier and applying this composition to the backing material by means of roll coating or the like. For convenience of handling, a 0.1–5 percent weight solution is preferred. The solvent or carrier is removed by evaporation thus leaving a thin film or residue of release agent on the backing member. Thus the release agents can be coated onto substrates from solutions, emulsions or latices.

As to the backing member, any material ordinarily used for this purpose may be used with the particular material chosen dependent on the end use for the adhesive tape. Examples of suitable backing materials include fibrous and nonfibrous materials which may be made by weaving, compounding, extruding, etc., as for example, backing materials such as paper, cotton and other cellulosic materials, plastics such as acetates, vinyl halides, polyalkylene and polyester films, glass fabrics, metal foils, etc.

The preferred solvents for all of the release agents of this invention are the aromatic hydrocarbons toluene and xylene because their vapor pressure ranges are particularly adaptable to the manufacture of pressure-sensitive adhesive tapes. Benzene can be used, but it is somewhat too volatile and solutions of the release agents in benzene evaporate too rapidly and may, at high temperatures, cause difficulty in obtaining a uniform distribution of the release agent on the backing material. It is preferred to add a small amount of dimethyl formamide, dimethyl sulfoxide, or a lower alcohol to the release composition. The amount added may be from ½–20 percent of the total solvent weight. Other solvents which may be used include tetrahydrofuran, butyl acetate and dioxane.

From the above discussion of the general objects, broad invention and specific embodiments it will be appreciated that the invention, in its broadest aspects, concerns a novel class of polymeric reaction compositions or products, namely certain polyureas and polycarbamates prepared by the reaction of fatty diamines with diisocyanates and optionally, a diol. Further, these polyureas and polycarbamates are highly useful as release agents and are particularly suitable in the manufacture of pressure-sensitive adhesive matieral, e.g., rolls of tape, and release liners or papers. Release liners find wide utility in, among other application, rolls of so-called "double-face" pressure-sensitive adhesive tapes.

In general, release liners or papers are manufactured by coating, according to usual techniques, a release agent or composition thereof onto some suitable backing member. Both surfaces of the backing member are usually coated with the release composition; however, in certain instances, it may be entirely satisfactory that only one of the surfaces of the backing member is coated with the release composition. The backing member is usually paper but it can also be of various other materials, e.g., various plastic materials. In point of fact, those backing member materials suggested for use as backing members for pressure-sensitive adhesive tape will be found entirely satisfactory as backing members for release liners.

The invention will be further illustrated and described by reference to the following specific examples. The proportions here and elsewhere are expressed as parts by weight unless specifically stated to the contrary.

EXAMPLE I

N-behenyl trimethylenediamine, 19.1 g (0.05 mol), was dissolved in 300 ml toluene and 9.1 g (0.0525 mol), 2,4-tolylene diisocyanate dissolved in 100 ml toluene was poured in it. The temperature of the reaction mixture rose to about 40°C. After stirring for 1-½hours, the excess isocyanate was capped with dibutylamine. The product was then precipitated by pouring it into 2 liters of methanol, filtered, washed with methanol and dried in a vacuum oven at room temperature.

A white product weighing 25.8 g (93 percent yield) was obtained which had the following properties:

The infrared spectra was that of a polyurea compound.
Melting point (by DTA): 67°C.
Intrinsic viscosity: 0.086

A 1 mil thick Mylar A, poly(ethyleneterephthalate), film was backsized with a 1 percent toluene solution of the polymer, using a 1 inch diameter bar tightly wound with a 5 mil thick wire. The solvent was evaporated in a forced air oven at 200° F. By using this same technique the uncoated side of the film was then primed with a 10 percent toluene-acetone (6:1) solution of the following composition:

| COMPONENT | PARTS BY WEIGHT |
|---|---|
| Nitrile Rubber | 100 |
| Chloroprene | 40 |
| Zinc Resinate | 60 |

The primed side was then coated with a 32 percent dispersion in toluene of a pressure-sensitive adhesive, at 1.2 ounces (dry) per square yard, of the following composition, using a reverse roll technique and driving the solvent off at 240° F.

| COMPONENTS | PARTS BY WEIGHT |
|---|---|
| Natural Rubber | 25 |
| Polyisoprene | 50 |
| Styrene-Butadiene Rubber | 25 |
| Zinc Oxide | 50 |
| Petroleum Hydrocarbon Resin | 70 |
| Dehydroabietic Acid | 10 |
| Alkylated Phenolic Resin | 7 |
| Oil Plasticizer | 40 |
| Antioxidant | 2 |

The adhesive material was then wound upon itself and slit into 1 inch by 60 yard dimension rolls. Prior to testing, these rolls were submitted to accelerated aging as follows:

Temperature Aging (TA): Forced air oven at 150° F. for 16 hours.

Cycle Aging: TA + 72° F., 50 percent R.H. for 24 hours, plus oven at 150° F., 85 percent R.H., oxygen atmosphere, 20 inch mercury pressure, 2.5 hours.

Physical testing of the aged rolls yielded the following results:

| | Aging Conditions | Back-sized | Not Backsized |
|---|---|---|---|
| Unwind Adhesion[a], lbs./in. | Cycle | 1.6 | 5.9 |
| Unwind Adhesion[a], lbs./in. | Shelf, 1 wk. | 0.7 | 4.1 |
| Unwind Adhesion[a], lbs./in. | Shelf, 11 mos. | 1.0 | — |
| Adhesion to Stainless Steel[b], oz./in. | TA | 46 | 43 |
| Quickstick to Stainless Steel[c], oz./in. | TA | 24 | 18 |

[a] Pressure Sensitive Tape Council Test, PSTC-8. The force required to remove the tape from the roll at 150 ft./min.
[b] PSTC-1 – 180° angle peel.
[c] PSTC-5 – The force resisting peeling of a tape at 90° angle from a standard surface upon which it has been applied under no other pressure than the weight of the tape itself.

EXAMPLE II

Toluene, 40 ml., and N-behenyl trimethylenediamine, 10.25 g (0.025 mol), were mixed in a 250 ml. capacity Erlenmeyer flask until complete solution resulted. 2,4-tolylene diisocyanate, 9.13 g (0.0525 mol) was poured into the amine solution by stirring. Bis-2-(hydroxyethyl) propionic acid powder, 3.35 g (0.025 mol), and 100 ml toluene were then added and stirred for 3 hours. The powder was still in suspension. The mixture was then heated to 70° C. and 58 ml DMF was added. Within a few minutes, complete dissolution resulted containing 11.1 percent of a solid material. The high viscosity and the infrared spectra of the solid indicated that a polymeric material having urea and carbamate groups was obtained.

Rolls of pressure sensitive adhesive tapes were prepared the same way as described in Example I, except for the release agent, which was, in this case, prepared according to this Example. Tapes having the following properties were obtained:

| | |
|---|---|
| Unwind Adhesion | |
| Cycle Aged | 0.7 lbs./in. |
| Shelf Aged, 7 days | 0.5 lbs./in. |
| Shelf Aged, 11 months | 0.8 lbs./in. |
| Adhesion to Stainless Steel | 40 oz./in. |
| Quickstick to Stainless Steel | 23 oz./in. |

EXAMPLE III

A pressure sensitive adhesive tape similar to the one described in Example II was prepared with a slight modification in the preparation method of the release agent. The modification consisted of reversing the order of the diamine and the diol addition to the reaction mixture. The infrared spectra and the viscosity properties indicated that the polymer is similar to the one obtained in Example II. However, the properties of the tape are as follows:

| | |
|---|---|
| Unwind Adhesion | |
| Shelf Aged, 7 days | 0.7 lbs./in. |
| Cycle Aged | 1.2 lbs./in. |
| Adhesion to Stainless Steel (TA) | 35 oz./in. |
| Quickstick to Stainless Steel (TA) | 17 oz./in. |

EXAMPLE IV 2,4-Tolylene diisocyanate, 76.9 g, was dissolved in 200 ml dry methylethyl ketone. Simultaneously, 82 g of tartaric acid, dissolved in 300 ml methylethyl ketone, and 30 g of N-behenyl trimethylenediamine dissolved in 150 ml N,N-dimethylformamide, were added to the diisocyanate solution for 2 hours. The temperature was maintained below 50° C. by cooling with cold water.

The solution became more and more viscous on standing, indicating buildup in molecular weight. The infrared taken after 2 days showed carbamate and urea formation and only a trace amount of isocyanate.

Pressure-sensitive adhesive tapes obtained according to the procedure described in Example I had the following properties:

| | |
|---|---|
| Unwind Adhesion | |
| Shelf Aged, 7 days | 0.9 lbs./in. |
| Cycle Aged | 1.1 lbs./in. |
| Adhesion to Stainless | |
| Steel (TA) | 37 oz./in. |
| Quickstick to Stainless | |
| Steel (TA) | 19 oz./in. |

EXAMPLE V 2,4-Tolylene diisocyanate, 123.9 g (0.712 mol), and 50 g N,N-dimethylformamide were weighed out into a three-necked flask equipped with a condenser, a calcium chloride tube, stirrer, thermometer, heater and nitrogen inlet. N-behenyl trimethylenediamine, 153.8 g (0.375 mol), dissolved in 700 ml toluene was slowly added so as not to exceed 60° C. and stirred for ½ hour. Then 100 g N,N-dimethylformamide was added to the reaction mixture and stirred at 55° C. for 3 hours. Infrared spectra shows only trace amounts of isocyanate groups left unreacted. The viscosity at this point, at 25° C., is 330 cps. The polymer was then precipitated by pouring the solution into 2.5 liters of acetone, filtered, washed and dried. The white powder obtained has an intrinsic viscosity in a 9 to 1 mixture of toluene to N,N-dimethylformamide of 0.062 and an acid equivalence of 819.

A ½ mil poly(ethylene terephthalate) film was coated with a laminating cement having the following composition:

| COMPONENT | PARTS BY WEIGHT |
|---|---|
| Nitrile Rubber | 16.0 |
| Chloroprene | 6.4 |
| Zinc Resinate | 9.6 |
| Toluene | 61.2 |
| Acetone | 6.8 |

After solvent evaporation in a forced air oven, a glass cloth having 52 warp yarns per inch and 8 fill yarns per inch was laminated to it. The film side of the sandwiched cloth was then backsized and dried as in Example I with the release agent of this example. The backsize solution had the following wet composition:

| COMPONENT | PERCENT BY WEIGHT |
|---|---|
| Release Agent | 2 |
| Toluene | 93 |
| N,N-Dimethylformamide | 5 |

The glass cloth side of the laminate was then coated with the following adhesive mass composition dispersed in water and having a total solids content of 45 percent:

| COMPONENT | PARTS BY WEIGHT |
|---|---|
| Natural Rubber | 70 |
| Styrene-butadiene Rubber | 30 |
| Synthetic Polyterpene | 65 |
| Sulfur Curative | 1 |
| Butyl Zimate | 1 |
| Thickener | 1 |
| Emulsifier | 1 |

The mass coated laminate was then dried in a forced air oven at 240° F. to yield 3.0 ounces of dry adhesive mass per square yard of fabric, slit into ¾ inch by 60 yard rolls and submitted to accelerated aging before testing. The results, which include tapes made in a similar way but backsized with what is considered the two best release agents commercially available are summarized in the following table:

| | Release Agent of this Example | Commercial Release Agent | |
|---|---|---|---|
| | | A | B |
| Unwind Adhesion, lb./in. Cycle Aged | 2.4 | 9.3 | 8.5 |
| Adhesion to Stainless Steel (TA) Aged, oz./in. | 41 | 40 | 41 |
| Quickstick, (TA) Aged, oz./in. | 20 | 19 | 20 |

From the data shown in the examples, it is apparent that the release agents of this invention provide better unwind adhesion than those commercially available release agents while retaining good adhesion and quickstick.

The invention has been described herein by reference to certain preferred embodiments. However, as variations thereon will appear to those skilled in the art, the invention is not to be considered as limited thereto.

What is claimed is:

1. A pressure-sensitive adhesive tape comprising a backing member, a pressure-sensitive adhesive on the front side thereof, and as a release agent on the backside thereof, a polymeric composition of the general recurring formula:

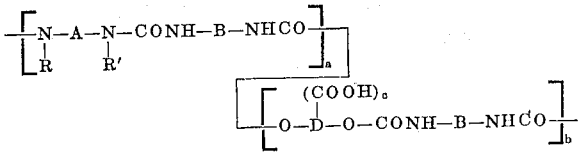

wherein A is an alkylene radical containing about two to six carbon atoms, B is an arylene radical containing about six to 16 carbon atoms, D is an aliphatic organic radical containing about two to six carbon atoms, R is an alkyl radical containing about 12 to 25 carbon atoms, R' is hydrogen or an alkyl radical containing about one to 25 carbon atoms, a and b represent the number of recurring units and the ratio of b/a varies from 0 to 2, and c is 0, 1 or 2.

2. A pressure-sensitive adhesive tape according to claim 1 wherein A is ethylene, propylene, butylene, isobutylene, pentylene or hexylene, B is phenylene, tolylene, naphthylene, biphenylene or alkyl substituted derivatives thereof wherein the alkyl group has one to five carbon atoms and D is alkylene containing two to six carbon atoms.

3. A pressure-sensitive adhesive tape according to claim 2 wherein B is tolylene.

4. A pressure-sensitive adhesive tape according to claim 2 wherein R' is hydrogen.

5. A pressure-sensitive adhesive tape according to claim 4 wherein R is behenyl or stearyl.

6. A pressure-sensitive adhesive tape according to claim 1 wherein A is propylene, B is tolylene, R is behenyl, R' is hydrogen.

7. A pressure-sensitive adhesive tape according to claim 6 wherein $c$ is 1.

8. A pressure-sensitive adhesive tape according to claim 6 wherein $c$ is 2.

9. A pressure-sensitive adhesive tape according to claim 6 wherein the backing member is a polyester or cellulosic material.

10. A pressure-sensitive adhesive tape according to claim 9 in the form of a roll.

* * * * *